United States Patent [19]
Nishiguchi

[11] 3,887,797
[45] June 3, 1975

[54] DEVICE FOR AUTOMATICALLY ADJUSTING FAULT NULL POINT INDICATION OF DIGITAL SCALE

[75] Inventor: Yuzuru Nishiguchi, Tokyo, Japan

[73] Assignee: Shinko Denshi Kabushiki Kaisha, Tokyo, Japan

[22] Filed: Sept. 26, 1973

[21] Appl. No.: 400,816

[30] Foreign Application Priority Data
Oct. 14, 1972 Japan............................ 47-102944

[52] U.S. Cl............................ 235/151.33; 177/210
[51] Int. Cl............................................. G01g 19/00
[58] Field of Search............... 235/151.33; 177/210; 318/646

[56] References Cited
UNITED STATES PATENTS

| 3,192,535 | 6/1965 | Watson | 177/1 |
| 3,274,377 | 9/1966 | Morison | 235/151.33 X |
| 3,439,524 | 4/1969 | Rogers | 235/151.33 X |
| 3,604,525 | 9/1971 | Blethen et al. | 177/210 |
| 3,618,685 | 11/1971 | Fiet | 177/210 |
| 3,684,875 | 8/1972 | Smith et al. | 235/151.33 |

Primary Examiner—Malcolm A. Morrison
Assistant Examiner—Edward J. Wise
Attorney, Agent, or Firm—Wenderoth, Lind & Ponack

[57] ABSTRACT

Device directing to an automatical adjustment of fault null point indication of a digital scale, which involves digital voltmeter for receiving an electric analogue signal proportional to the weighed value of an object. Said device essentially comprises a calculator accompanying with an integrator in conjunction with said digital voltmeter. The calculator serves for distinguishing whether the indicated value on the digital voltmeter, in dependence on polarity and magnitude thereof, is to be eliminated as a fault numeral indication in comparison with the preset slight numeral range or not; and for feeding back the adjusting signal to a mechanical or sole electric means through the integrator to induce shifting of the fault indication to the correct null point indication.

3 Claims, 4 Drawing Figures

3,887,797

DEVICE FOR AUTOMATICALLY ADJUSTING FAULT NULL POINT INDICATION OF DIGITAL SCALE

This invention relates to a device for automatically adjusting a fault null point indication of a conventional digital scale.

Generally, a digital scale device, an apparatus for numerically displaying the weighed value of an object, provided with a digital voltmeter receiving an electric analogue signal proportional to the weight of said object is widely used. This is because there is no observational error when it is used and also because it is capable of use in combination with a printer or a computer.

However, the digital scale, when repeatedly used or even it is left unused for long periods of time, tends to cause a certain shift in its null point indication. This is due to a failure in the function of its mechanical construction and partially to a mishap in its electric circuits.

Such shift of the null point indication may often take a faulty numeral indication of 1 or 2, for example, instead of the exact zero at the lowest digit on the digital voltmeter.

The faulty numeral indication, even though it is small in its absolute value to an extent that may be negligible, not only causes the user of the scale to mistrust the accuracy of the scale, but also results in a certain incorrect measurement, when the scale is used without adjustment of such a fault null point indication.

Now, this invention is originated in the observation of the facts that a digital scale typically has a maximum zero point shift only about 0.2 percent of the scale capacity and that the indication of a weighed value ordinarily restores fix to the initial null condition, when the scale is unloaded. A novel device has thus been provided by the present invention, which is capable of an automatic adjustment of an eventual null point shift on a digital scale os that an exact null point indication is always maintained, when the scale is unloaded.

The invention will be apparent from the following description when read in connection with the accompanying drawings, in which FIG. 1 is a schematic drawing for explanation of principle of the mechanism of hitherto known digital scale;

Figure 1:
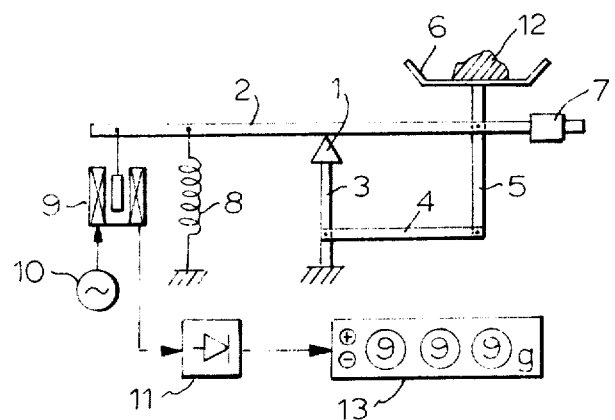

In FIG. 1, the digital scale comprises a fulcrum represented by the numeral 1; a beam 2 supported by said fulcrum; links 3, 4 and 5; a pan 6 for receiving an object 12 to be measured; a counterpoise weight 7 for balancing the scale, and a spring 8. One end of the beam 2 is connected to a differential transformer 9 which is excited by an a.c. power source 10 supplying a constant voltage. A rectifier 11 is provided for rectifying the output of the differential transformer 9. A digital voltmeter 13 receives the output of the differential transformer 9 through the rectifier 11, which output is proportional to the weight of the object 12 loaded on the pan 6. Thus the weight of the object is numerically displayed on the digital voltmeter.

The lower end of the conventional digital scale, usually its zero point is adjusted manually by the counterpoise weight 7 or by any other electric means so that the zero is exactly indicated when the scale is unloaded. However, the adjusted null point indication might gradually change due to changes in such conditions as oscillation, horizontal level, ambient temperature, characteristics of electric circuits, and backlashes of mechanisms, when the scale is subjected to repeated use or left for a long time. In a digital scale having a maximum weighing capacity of 999 grams, for example, there might occasionally develop a mis-indication to an extent of +2 grams or −1 gram at the null point, after the elapse of long period of time from the null point adjustment.

In the hitherto known digital scale, such a failure in the null point indication is usually manually adjusted as occasion arises.

Now, the present invention has an object of providing a means for automatic adjustment of the probable shift of the null point indication without the necessity of a troublesome manual operation by the user.

Figure 2:
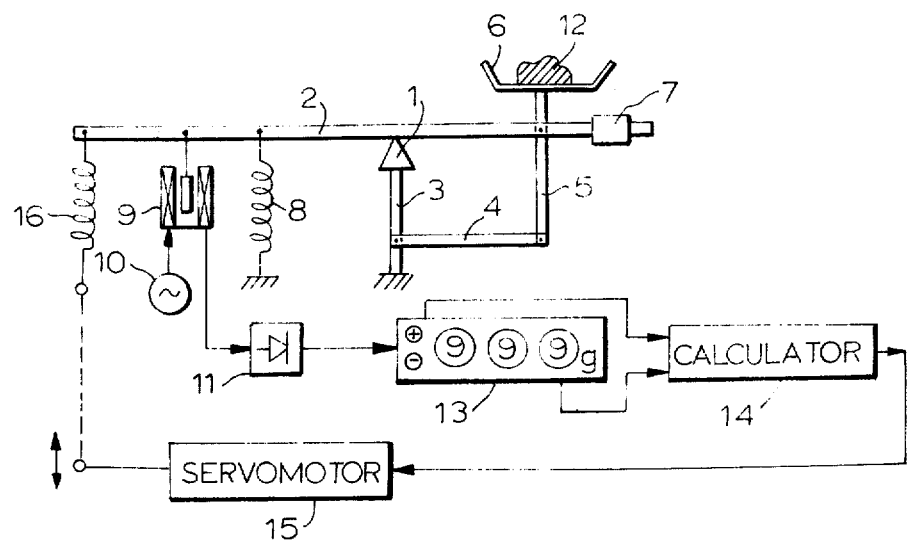
FIG. 2 is a schematic drawing showing an embodiment of the digital scale of the present invention.

Device shown in FIG. 2 is an embodiment of the present invention, which includes, in addition to the entire device of digital scale as shown in FIG. 1, a calculator 14, a servomotor 15 and a zero adjusting spring 16.

Electric signals supplied to the calculator 14 from the digital voltmeter 13 involve two kinds, one of which is a polarity signal for distinguishing whether the indication is plus(+) or minus(−) polarity and the other is a numeral value signal to distinguish whether the value is within or without the slight numeral range preset for the purpose of automatic adjustment to the zero point.

Since a commercially available digital voltmeter usually provides binary coded decimal output terminals, it is convenient in view of simplicity and reasonability to choose the slight numeral range in such a manner that all digits above the lowest show 0 while the lowest digit shows either less than 3 or less then 7 with exception of 0. More concretely, it is desirable to choose from 1 gram to 3 grams and also from −1 gram to −3 grams; or else from 1 gram to 7 grams and also from −1 gram to −7 grams as the slight numeral range for the intended adjustment of the zero point, where a given digital scale possesses a measuring capacity of up to 999 grams, for example.

Although there may be four arbitrary combinations with the two kinds of polarities combining the two different indication ranges concerned with the required adjustment of the zero point, the present invention utilizes three kinds of the output signals (a), (b) and (c) as tabulated below, which are obtained from the calculator 14, wherein the slight numeral range, for the sake of simplicity, is choosen to be ±1 to ±3.

| (a) Polarity | (b) Indicated value | (c) output signal of the calculator |
|---|---|---|
| + | 1 – 3 | + |
| − | 1 – 3 | − |
| + | other than 1 – 3 | 0 |
| − | other than 1 – 3 | 0 |

Figure 3:
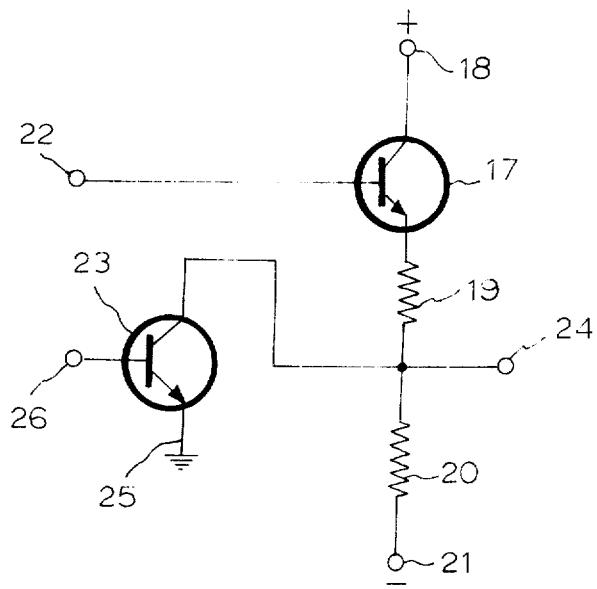
FIG. 3 shows an electric circuit for the calculator, one of the essential elements for the construction of the device of this invention.

Any type of the various circuits can be utilized for the calculator 14 as shown in FIG. 3, for example, which is capable of producing the above tabulated output signal, so far as it gets +5 volts, from the digital voltmeter 13, when the polarity is (+); 0 volt when the polarity is (−); 0 volt when the indication falls within the range of 1 − 3; and +5 volts when the indication is other than 1 − 3.

In FIG. 3, the collector of the transistor 17 is connected to the (+) power source 18 and the emitter is connected through the resistors 19 and 20 to the (−) power source 21. The base 22 receives the polarity signal from the digital voltmeter 13 shown in FIG. 2.

If the transistor 23 is not in existence, then +2 or −2 volts, for example, are received respectively at the output terminal 24, when 5 volts or 0 volt of the polarity signal is applied to the base 22 under a suitable choice of circuit constants. The resulting +2 or −2 volts at the output terminal is utilized as the output signal of the calculator 14 for the purpose of this invention.

In practice, the emitter of the transistor 23 is connected to the ground 25 having zero voltage, and the collector is connected to the output terminal 24, and furthermore, the indication signal is applied to the base 26. Consequently, when the indication falls within the preset slight numeral range of 1 to 3, and then 0 volt is applied to the base 26, the transistor 23 is brought to a status of "OFF," and there will appear, as would occur in the element of the transistor 23, +2 or −2 volts respectively at the output terminal 24 according to the (+) or (−) polarity signal given to the base 22. On the contrary, if the indication is other than 1 to 3 involving 0, +5 volts are applied to the base 26 to bring the transistor 23 to a status of "ON," and as the result of the short circuit between the output terminal 24 and the ground 25, the output at the output terminal 24 will become to 0 independent of the (+) or (−) polarity signal.

In the device of the present invention as shown in FIG. 2, which includes the above mentioned calculator 14, the servomotor 15 will start rotating in a normal direction due to the (+) output signal of the calculator 14, when the digital voltmeter 13 indicates +2, for example. The zero adjusting spring 16 is thus pulled down to decrease said +2 indication first to +1 and then 0. When the indication reaches 0, the output signal of the calculator 14 becomes 0 and then the rotation of the servomotor 15 stops so that no more change in the indicated value occurs and a continuous 0 indication is thus maintained.

On another occasion where the indication on the digital voltmeter shows −1, for example, the servomotor 15 will start rotating in a reverse direction to that aforementioned. The spring 16 is thus pressed to move said (−) indication toward the (+) direction until it reaches zero. The purposed adjustment of the fault indication is thus performed, too.

Figure 4:
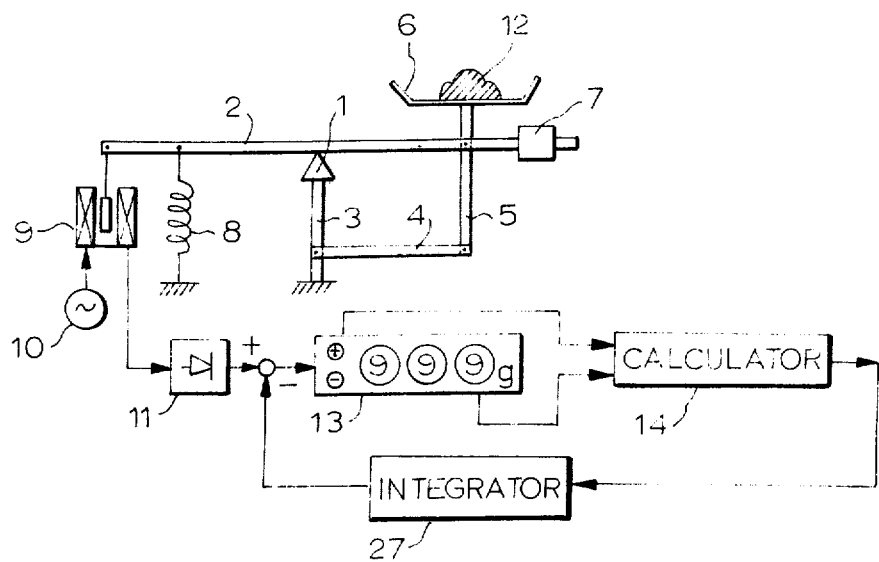
FIG. 4 is a schematic drawing showing another embodiment of the digital scale of this invention.

FIG. 4 shows another embodiment of this invention, wherein the intended adjustment of a faulty null point indication is effected solely by an electric means. In the device of FIG. 4, an electronic integrator is employed instead of the servomotor 15 and the zero adjusting apring 16 of FIG. 2. More precisely, the device of FIG. 4 is constructed as a digital scale similar to that shown in FIG. 1, but has a calculator 14 and integrator 27. In this embodiment, adjustment of an erroneous indication, if any, is carried out by deducing the integrated output voltage obtained in the integrator 27 from the input voltage of the digital voltmeter 13, said integrated output voltage being obtained by integrating the (+) or (−) output signal of the calculator 14 by means of the integrator 27, when the indication falls within the slight numeral range preset for the intended correction. When the purposed restoration of the 0(zero) indication is established and when the input voltage of the integrator 27 is thus returned to zero, said output voltage is retained at zero, and accordingly, the resulting zero indication is held continuously. This condition corresponds to that of the system of the device shown in FIG. 2, where the rotating of the servomotor 15 stops and the spring 16 is held its optimum length adapted for the performance of the required adjustment. It may therefore be said that the servomotor 15 in the device of FIG. 2 serves as an electromechanical intogrator by which the required correction of the faulty numeral indication is effected by feeding back the resultant integrated value to the mechanical part of the digital scale, whereas the integrator 27 in the device of FIG. 4 serves as a pure electronic integrator by which the required correction is effected by feeding back the output voltage for the correction to part of the electric circuits of said performed digital scale.

Since it is believed that the construction of the device and the principle of the functions of the digital scale of this invention are made clear by the above explicit explanation, an actual use of the device for a weight measurement of an object will be dealt with as follows:

A digital scale is first actuated by switching on the electric circuit thereof. When an exact null indication is given by the unloaded digital voltmeter no actuation for correction occurs. When the digital voltmeter gives an erroneous numeral indication falling within a preset range of ±1 to ±3, for example, then the means for correction immediately starts to establish an automatic restoration, resulting in an exact null indication. Finally when said fault numeral indication exceeds the preset range, means for the correction is not activated. For such an extreme case, a manual operation is needed to bring the faulty indication into the preset range such as ±1 to ±3, and then the means for correction can automatically make the required adjustment in accordance with the manner as aforementioned. It should, nevertheless, be noticed that such an extreme case almost never occurs, so far as a conventional digital scale having a maximum weighing capacity of 999 grams, for example, is concerned. The difficulty may, aternatively be overcome, by broadening, the preset slight numeral range to from ±1 to ±7, for example, in lieu of the aforementioned narrower range.

Even though a satisfactory adjustment of a static null point indication has been established, a digital scale of a high sensibility and a quick responsibility is liable to cause a fluctuation within a range of 0 to ±1 gram, for example, due to the effect of the surroundings such as vibration of the foundation, wind and the like. Similar fluctuation may also occur on the digital voltmeter in the weighing operation apart from the zero point. Such difficulty may be removed in practice either by lowering the sensitivity of the digital scale or by using the scale but isolating from interference from, for example, the vibration and wind. Therefore, the fluctuation at the null point indication scarcely appears in practice.

The automatic adjustment of the null point indication in the present invention is effected on the basis of the integrating procedure. Therefore, there would not be an erroneous adjustment even if there occurs, at the worst, such an adverse fluctuating indication. In one example, the scale is adjusted in such a manner that a voltage for correction produced in the integrator 27 in FIG. 4 is equivalent to +1 gram or −1 gram when the calculator 14 produces a (+) or (−) output signal continuously for 2 seconds. If the indication displays +1 gram and −1 gram alternately at 2 Hz, the output of the integrator 27 does not come up to the level equipment to ±1 gram and accordingly, no automatic adjustment for the indication is effected at all, because the (+) and (−) signals are given by the calculator 14 alternately every 0.25 seconds to the integrator 27.

When an object 12 is placed on the pan 6 of the digital scale under exact null point indication at no load according to this invention, there may be obtained a digital indication of 552 grams, for example, which represents the weight of the object. Under the situation, no steps are taken for adjusting the indication, because the indicated value is outside the preset range of from ±1 to ±3 preset for the intended correction. In the transient state for obtaining 552 grams indication starting from 0, the analogue signal given to the digital voltmeter 13 passes through the preset range of from 1 to 3 grams. The digital voltmeter 13 does, however, not indicate 1 to 3 grams, because the period of time of the signal passing through said numerical range is almost instantaneous and because the sampling frequency of the digital voltmeter is considerably low such as the extent of 2.5 Hz. Even if there eventually occurs such a undesirable fluctuating numerical indication, it would actually not continue for the 2 seconds required to shift the indication. Under the circumstances, there would not occur a fault adjustment during the measuring operation.

Similar phenomenon may also take place while the original null indication is being restored, when the object is removed from the pan 6. The means for adjustment, for the same reason as that aforementioned, is thus held without action. In practice, automatic adjustment may take place only when there is a dislocation of the zero point, after the indication stabilized at no load condition, which falls within the preset numeral range of from 1 to 3 grams instead of a correct zero gram indication.

Since this invention provides a working system which is adapted for an automatic adjustment of the null point indication when the indication falls within the preset numeral range of ±1 to ±3, to restore the correct zero within a few seconds, it is recognizable that when an object having a weight of 2 grams, for instance, is placed on the pan 6 of the digital scale having a meximum weighting capacity of 999 grams, for example, the indication of 2 grams will appear on the digital voltmeter 13 at first. In this situation, the means for adjustment, as is recognizable from the above, will start its action, and said 2 grams indication, even though it is the true weight of said object, will be changed to the zero indication via the numeral 1 after a while.

However, there is, in fact, scarcely a necessity of weighing an object of 3 grams or less by using the digital scale of a relatively large weighing capacity such as 999 grams, because the weight of 3 grams corresponds only to 0.3 percent of said 999 grams. Consequently the technical benefit achievalbe by the subject digital scale would not be impeded by such an extreme case. Certainly, when an object having a weight of 3 grams or less, for example, measured by using the abovementioned digital scale, such may, of course, be carried out by temporally turning off the automatic adjustment device.

In the exemplification of the devices shown by FIGS. 2 and 4, there are used the spring balance and the differential transformer as the essentiol constructive units of the digital scale. However, instead of these units, there may equally be employed any of known measuring mechanisms such as, of the pendurum, load cell and electromagnetic force balancing systems and any of electric transducers of wire-strain gauge, semiconductive strain gauge, magnetostriction and photocell for the construction of the device according to the present invention.

As is evident from the above explanations, dislocation of the null point indication, if any, which may occur due to failure of the function of the mechanical constructive portion or the function of the electric constructive portion of the digital scale, may be corrected to restore the exact null point indication. The digital scale provided with the device of this invention further gives an outstanding accuracy in the weight measurement with ease in handling, and has therefore benefits in the industrial viewpoint.

What is claimed is:

1. In a digital scale system of the type having a digital voltmeter to which an input voltage proportional to a measured weight of an object is provided from an electric transducer consisting of a weighing system, and a device for automatically adjusting a faulty numeral indication at the null point to the exact 0, said device comprising:

a calculator operatively coupled to and receiving two kinds of electric signals from said digital voltmeter, one being a signal for distinguishing whether the polarity of the indication on the digital voltmeter is (+) or (−), and the other being for distinguishing whether said indication is within or without the preset slight numeral range, a positive (+) output signal being produced by said calculator where the indication of (+) polarity falls within the preset numeral range, a negative output signal being produced by said calculator when the indication of (−) polarity falls within the preset slight range, and an output of 0 being produced independent of said distinguished polarity when the indication falls without the preset slight range; and an integrator coupled to said calculator for receiving the output signal thereof and coupled to said transducer for feeding back its output to one of a mechanical and electric means in said electric transducer until the indication of said digital voltmeter becomes correct 0 at the null point.

2. The device for automatically adjusting a faulty numeral indication at the null point of the digital scale as mentioned in claim 1, wherein the integrator is a servomotor for feeding back its mechanical motion to a zero adjusting spring in the weigh system.

3. The device for automatically adjusting a faulty numeral indication at the null point of the digital scale as mentioned in claim 1, wherein the integrator is an electronic integrator for feeding back its output voltage to the input of the digital voltmeter.

* * * * *